Oct. 3, 1967    B. GREENE    3,344,437
CAP WITH REMOVABLE VISOR STIFFENER
Filed March 2, 1966
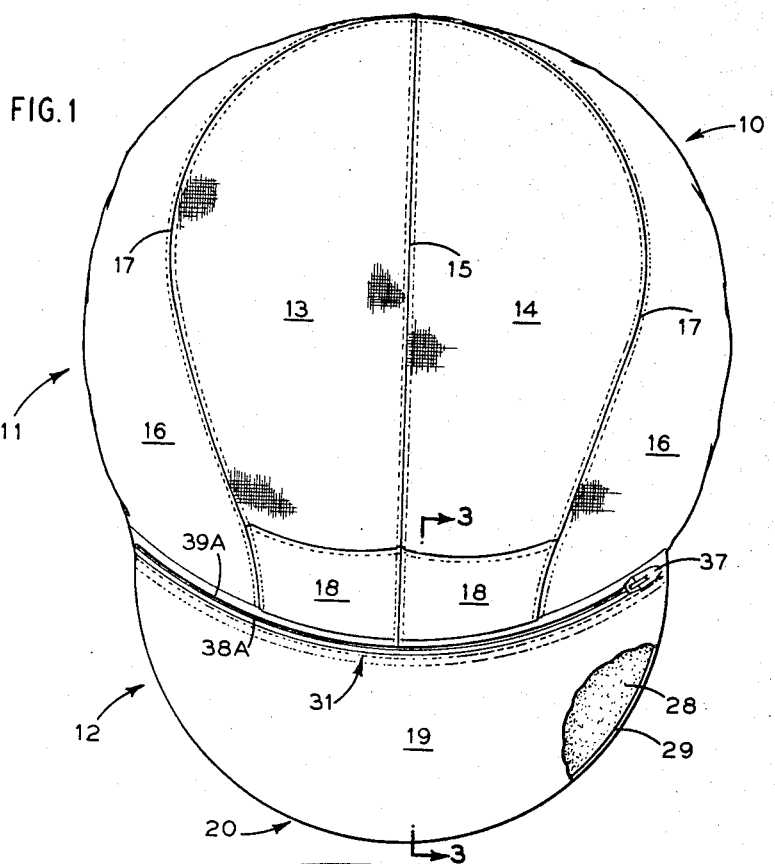
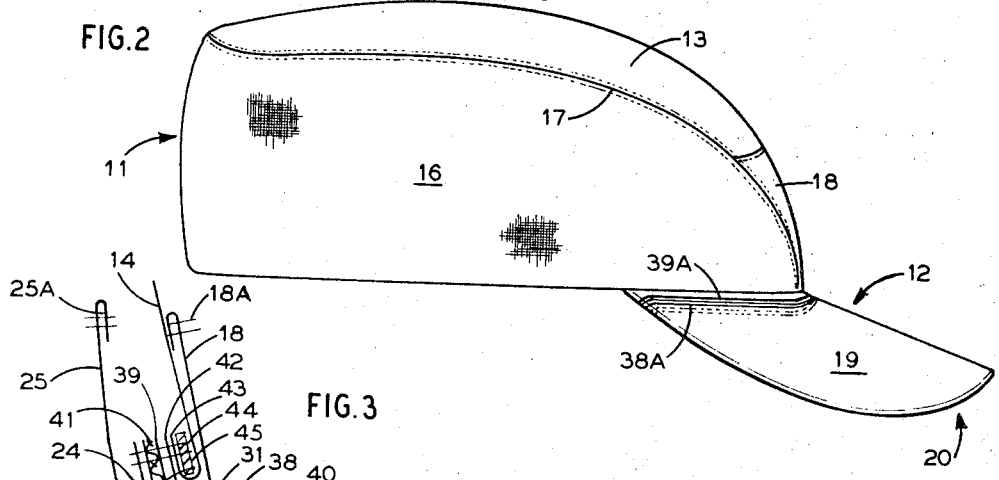
INVENTOR.
Ben Greene
BY Philip S. Hilbert
ATTORNEY

United States Patent Office 3,344,437
Patented Oct. 3, 1967

3,344,437
CAP WITH REMOVABLE VISOR STIFFENER
Ben Greene, 318 W. 51st St., New York, N.Y. 10019
Filed Mar. 2, 1966, Ser. No. 531,285
6 Claims. (Cl. 2—195)

This invention relates to caps, and more particularly concerns caps having a visor construction such that the stiffening element thereof, is removable therefrom.

Caps, and particularly sports caps, of conventional construction have a rather limited useful life, principally because the cap becomes soiled and unsightly, and can not be laundered to restore the same to a wearable condition. Since such caps are normally used under conditions which induce rapid soiling of the cap, caps are discarded because of their unsightly appearance and not on account of excessive wear of the fabric thereof.

While caps are normally made of launderable fabrics, the stiffening element found in the visor portion thereof is adversely affected on contact with water or washing solutions, since the stiffening element is usually made of cardboard or similar material, and may have a stiffening impregnant. Thus, on washing such a cap, the stiffening element is either subject to complete or partial disintegration, or may be damaged to an extent that it can no longer act as a stiffening element.

If the stiffening element of a cap visor could be temporarily removed, to permit the fabric cap construction to be laundered, and followed by reinsertion of the stiffening element into the cap visor, the normal life of the cap could be extended substantially. However, no cap construction having a removable visor stiffening element, has heretofore been offered, which is of an appearance not materially different from a conventional cap and is otherwise acceptable to the user.

Accordingly, an object of this invention is to provide an improved cap having a visor construction adapted to removably receive in the pocket thereof, a visor stiffening element; the opening of the pocket through which the stiffening element passes into or out of the pocket being inconspicuous and having closure means therefor which is substantially concealed from view, so that the complete cap has the normal appearance of a conventional cap.

Another object of this invention is to provide in a cap of the character described, a slide fastener closure for the opening in the visor pocket thereof, together with visor portions which substantially conceal such closure from view, yet permitting easy operation of the closure means for opening and closing the visor pocket.

A further object of this invention is to provide in a cap of the character described, a visor pocket construction and closure therefore, which facilitates the removal of the visor stiffening element therefrom, and the reinsertion thereof.

Still another object of this invention is to provide a cap of the character described, and having an improved visor pocket construction which lends itself to conventional cap fabricating techniques and economical fabricating costs.

Other objects of this invention will in part be obvious and in part hereinafter pointed out.

In the drawing, FIG. 1 is a top plan view of a cap embodying the invention;

FIG. 2 is a side elevational view thereof;

FIG. 3 is a sectional view taken on the line 3—3 of FIG. 1.

Essentially, the cap embodying the instant invention includes a pocket portion in the visor for receiving the usual visor stiffening element; the pocket portion having an access opening at the juncture of the rear portion of the visor and the forward lower edge portions of the crown of the cap, to permit the removal of the stiffening element from said pocket. The pocket opening is closed by slide fastener closure means which is effectively concealed from view so as not to detract from the normal appearance of the cap.

Thus, as shown in the drawing, 10 designates a cap embodying and invention. The same comprises the usual crown portion 11 and a visor portion 12 projecting therefrom. Crown portion 11 is formed of a pair of top panels of washable fabric 13, 14 stitched together as at 15, and a single side panel 16 of similar fabric, stitched to the outer edges of panels 13, 14, as at 17. Conventional, small pocket forming panels 18, hemmed at their top edges 18A, are located over the forwardly disposed portions of crown panels 13, 14, extending to visor portion 12 and separated vertically by stitching 17.

The visor portion 12 of cap 10 comprises a top panel 19 of washable fabric, similar to that of the crown panels, and of crescent shape, with the forward convex edge thereof indicated at 20 and the rear concave edge thereof indicated at 21. The visor portion 12 further includes a bottom panel 22 of fabric similar to that of panel 19, and having a convex forward edge 23 and a concave rear edge 24. A headband 25 extending about the lower edge portions of crown panels 13, 14 and hemmed at its top edge 25A, is inturned along its bottom edge as at 25B and secured by stitching 26 to the rear edge 24 of bottom visor panel 22.

The fabric visor panels 19, 22 form a crescent shaped pocket 27 therebetween for receiving therein the usual crescent shaped visor stiffening element 28 having a convex forward edge 29 and a concave rear edge 30. Element 28 is formed of cardboard or the like of suitable gauge, and may be impregnated with synthetic resin, size or the like.

It is understood that stiffening element 28 is removably mounted in visor pocket 27, so that element 28 may be removed from said pocket, when the cap 10 as a whole is in a soiled condition. The remaining cap construction may then be washed or laundered in a normal manner, and thereafter, the stiffening element 28 may be reinserted into said visor pocket 27.

To this end, visor pocket 27 has a crescent shaped opening generally indicated at 31 and located adjacent the juncture of visor panel 19 with the lower edge portions of the crown panels 13, 14 and 16. The opening 31 is closed by slide fastener closure means generally indicated at 32.

The slide fastener closure means comprises the usual opposed tapes 33, 34 carrying the closure elements 35, 36 respectively, which closure elements are in opposed relation and interengaged or disengaged by the usual slide member 37, to thus open or close opening 31.

The tapes 33, 34 and their closure elements 35, 36 are concealed from view by a pair of folded fabric cover members 38, 39 located in laterally opposed relation and their free edges in abutting relation as at 38A, 39A, FIG. 3. Thus, as shown in FIG. 3, the rear edge 21 of top visor panel 19 is turned under and secured to tape 35 with cover member 38 interposed therebetween, by stitching 40. The free edge 38A of cover member 38 projects beyond the edge 21 of visor panel 19 and effectively overlies and conceals elements 35 on tape 33.

Folded cover member 39 has a wide mesh fabric core 41 interposed therein, member 39 being disposed between tape 34 and the inturned edge portions 42, 43 of pocket panels 18 and crown panels 13, 14 and 16, being secured together by stitching 44 which also passes through a narrow buckram reinforcing strip 45 interposed in the inturned portion 43 of crown panels 13, 14 and 16.

The stitching 26 which secures headband 25 to bottom panel 22, also passes through tape 34 and cover member 39, said edge 24 of bottom visor panel 22 extending beyond the abutting closure elements 35, 36.

It is understood that the rear edge portion 21 of top visor panel 19 is actually flattened and substantially coplanar with the folded cover member 38, so that said cover member appears to be an extension of panel edge 21.

The pocket 27 has a seamed edge at the forward edge portions 20, 23 of panels 19, 22, respectively, so as to smoothly receive the forward edge 29 of stiffening element 28. Thus, edge portion 23 is turned inwardly and edge portion 20 is also turned inwardly and the inturned edges are secured by stitching 46.

The pocketed construction of visor portion 12 lends itself to simple manipulation to remove stiffening element 28 from pocket 27, or the reinsertion thereof, after the cap has been laundered. Thus, the slide member 37 is moved from its extreme right hand position, FIG. 1 to the extreme left hand position to open opening 31 and permit the stiffening element 28 to be readily removed from pocket 27.

With opening 31 fully open, the stiffening element 28 may be reinserted in pocket 27 by first interposing the left hand corner of said element 28 into the pocket 27 and working the corner portion to smoothly fit under the extreme left hand portions of tapes 33, 34. The remainder of the element 28 may then be worked into the remainder of pocket 27, finally bringing the extreme right hand corner of element 28 in its proper position in said pocket 27. The slide member 37 is then moved to its extreme right hand position to completely close opening 31.

It has been found, that the cover members 38, 39 lie smoothly over the tapes 33, 34 and conceal the same. Only the slide member 37 is left exposed and being rather small is quite inconspicuous. Further, the several strips and tapes interposed between headband 25 and the forward crown portions lie smoothly without undue bulk or discomfort to the wearer of the cap.

As various changes might be made in the disclosed embodiment of the invention without departing from the spirit thereof, it is understood that all matter herein shown or described shall be deemed illustrative and not by way of limitation except as set forth in the appended claims.

What is claimed is:

1. In a cap construction having a crown portion and a visor portion projecting from a forward lower portion of said crown portion, said visor portion comprising a pair of superposed washable crescent-shaped fabric panels having forward and rearward peripheral edge portions, the forward peripheral edge portions of said panels being secured together to form a pocket therebetween, a flat crescent shaped stiffening element removably disposed within said visor pocket, a crescent-shaped access opening formed in the rearward peripheral edge portion of the topmost of said visor panels adjacent the forward lower portion of said crown portion for removing said stiffening element from said visor pocket to permit washing of said cap construction and for reinserting said stiffening element into said visor pocket, means for closing said access opening comprising a pair of tapes carrying slide fastener closure elements in laterally opposed relation, one of said tapes being secured to said rearward peripheral edge portion of said topmost visor panel, the other of said tapes being secured between the rearward peripheral edge portion of the bottommost of said visor panels and the forward lower portion of said crown portion, slide closure means for engaging and disengaging said closure elements on the opposed tapes on slidable movement thereof, and a pair of fabric cover members secured to one of said visor panels and the forward lower portion of said crown portion respectively overlying said tapes, said cover members having opposed abutting edge portions to effectively conceal said tapes, yet permitting movement of said closure member.

2. A cap as in claim 1 wherein one of said cover members is secured at its rear edge portion to the rear edge of said topmost visor panel, the free edge of said one cover member projecting beyond the rear edge of said topmost visor panel.

3. A cap as in claim 1 wherein the abutting edges of said cover members are in substantial registry with the opposed closure elements on said pair of tapes.

4. A cap as in claim 1 wherein the forward edge portions of the closure elements on the tape secured to said topmost visor panel is located slightly beyond the rear concave edge of said stiffening element.

5. A cap as in claim 2 wherein the free edge of the other of said cover members is located immediately adjacent the juncture of the lower edge portions of said crown portion and said visor portion.

6. A cap as in claim 2 wherein the other of said cover members is secured at its rear edge portion between the other of said tapes and the lower edge portions of said crown portion.

References Cited

UNITED STATES PATENTS

| | | | |
|---|---|---|---|
| 1,057,825 | 4/1913 | Hale | 2—195 |
| 2,544,840 | 3/1951 | Kowatsch | 2—252 X |
| 2,615,168 | 10/1952 | Tannenbaum | 2—197 |
| 2,740,967 | 4/1956 | Parets | 2—139 |
| 2,908,012 | 10/1959 | Feldman | 2—200 |

JORDAN FRANKLIN, *Primary Examiner.*

G. KRIZMANICH, *Assistant Examiner.*